United States Patent
Bader et al.

(10) Patent No.: US 8,365,629 B2
(45) Date of Patent: Feb. 5, 2013

(54) ARRANGEMENT OF A GEAR ON AN OUTPUT SHAFT OF A TRANSMISSION

(75) Inventors: Josef Bader, Friedrichshafen (DE); Stefan Renner, Bodman-Ludwigshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 540 days.

(21) Appl. No.: 12/531,939

(22) PCT Filed: Mar. 26, 2008

(86) PCT No.: PCT/EP2008/053542
§ 371 (c)(1),
(2), (4) Date: Sep. 18, 2009

(87) PCT Pub. No.: WO2008/119703
PCT Pub. Date: Oct. 9, 2008

(65) Prior Publication Data
US 2010/0031762 A1    Feb. 11, 2010

(30) Foreign Application Priority Data
Apr. 3, 2007   (DE) .......................... 10 2007 015 998

(51) Int. Cl.
*F16H 57/00* (2012.01)
(52) U.S. Cl. ........................................................ 74/411
(58) Field of Classification Search .................... 74/409, 74/411, 412 R, 413
See application file for complete search history.

(56) References Cited

U.S. PATENT DOCUMENTS

| | | | |
|---|---|---|---|
| 4,075,870 A * | 2/1978 | Seifried | 464/75 |
| 5,269,194 A * | 12/1993 | Reynolds | 74/363 |
| 5,829,306 A | 11/1998 | Komazaki et al. | |
| 6,658,955 B1 | 12/2003 | Fuhrer et al. | |
| 7,334,493 B2 | 2/2008 | Renner | |
| 7,565,847 B2 * | 7/2009 | Bader | 74/331 |
| 2006/0112778 A1 * | 6/2006 | Renner | 74/339 |

FOREIGN PATENT DOCUMENTS

| | | |
|---|---|---|
| DE | 24 47 582 A | 4/1976 |
| DE | 42 04 981 A1 | 8/1993 |
| DE | 196 30 804 A1 | 2/1998 |
| DE | 197 34 980 A1 | 2/1999 |
| DE | 199 27 080 A1 | 12/2000 |
| DE | 10 2004 010 270 A1 | 9/2005 |
| DE | 10 2004 057 126 A1 | 6/2006 |
| JP | 02003725 A * | 1/1990 |

* cited by examiner

*Primary Examiner* — Vicky Johnson
(74) *Attorney, Agent, or Firm* — Davis & Bujold, PLLC

(57) ABSTRACT

A configuration of a gear wheel (4, 5) on a main shaft (1) of a transmission, having at least two lay shafts (2, 3). The wheel (4, 5) is designed as a sum wheel or gear wheel, meshes with both of the lay shafts (2, 3), and is movable in the radial direction between lay shafts (2, 3). An elastic element (8, 13) is positioned, between the gear wheel (4, 5) and the main shaft (1), and/or between the gear wheel and the lay shaft to reduce radially movement of the gear wheel (4, 5).

11 Claims, 2 Drawing Sheets

ARRANGEMENT OF A GEAR ON AN OUTPUT SHAFT OF A TRANSMISSION

This application is a National Stage completion of PCT/EP2008/053542 filed Mar. 26, 2008, which claims priority from German patent application serial no. 10 2007 015 998.8 filed Apr. 3, 2007.

FIELD OF THE INVENTION

The invention concerns an arrangement of a gear on an output shaft of a transmission, comprising at least two lay shafts.

BACKGROUND OF THE INVENTION

It is known that in transmissions comprising a main shaft and at least two lay shafts, load equalization of the gear wheels, which are positioned on the main shaft, also called sum wheels, takes place in the radial direction. The sum wheels, which mesh with the gearing of the lay shaft, are positioned so that they can move radially and opposite to the main shaft, and are steered radially by the gearing of the lay shaft and centered, respectively. Axial guidance of the sum wheels, which are designed as gear wheels in a transmission, takes place through laterally mounted thrust washers.

Such a configuration of a transmission's sum wheels, comprising a main shaft and two lay shafts, is known to the applicant through DE 10 2004 010 270 A1. On a main shaft, two sum wheels are positioned and configured as idle gears which mesh with two lay shafts and which are positioned, under radial play, in reference to the main shaft.

Through DE 196 30 804 A1, a similar gear wheel configuration, supported on a main shaft of the transmission, became known to the applicant, whereby the gear wheel meshes with at least two lay shafts and exhibits radial play, in reference to the main shaft.

An arrangement of an additional sum wheel, also called main shaft wheel on a main shaft, is known to the applicant through DE 10 2004 057 126 A1. Here, a spring element, configured as a disc spring, is positioned between an axial thrust washer and the gear wheel to reduce axial play of the main shaft. Disadvantageous in these known configurations of sum wheels on a main shaft is the fact that noises (so called rattle noises) are being generated due to the radial movement of the wheel and an externally initiated oscillation.

SUMMARY OF THE INVENTION

It is the purpose of this presented invention to improve the previously discussed configuration and art in a way that unwanted rattle noises are prevented, or at least reduced.

An elastic element is positioned, between the gear wheel and the main shaft and/or the gear wheel and the lay shafts, which limits, hinders or dampers radial movement of the gear wheel. Herewith, the noises are prevented. However, due to the presence of the elastic element, load balancing takes place between the gear wheel and the main shaft or the gear wheel and the lay shafts.

In an advantageous embodiment of the invention, the elastic element is configured as a spring ring, which is elastically deformable in the radial direction, therefore setting the elastic spring load against the radial movement of the gear wheel or the main shaft, respectively. Such a spring ring is mounted cost efficiently and easily. Advantageously, a slide ring can be positioned between the spring ring and the gear wheel to reducing the friction.

In an additionally preferred embodiment, the gear wheel has a washer with radial guidance which is located in a groove of the main shaft and strained by an elastic spring ring.

In a preferred embodiment, the elastic element is positioned between the gear wheel and the main shaft and is configured as a single piece. It is also possible to design the elastic element, positioned between the gear wheel and the main shaft, as a multi-piece configuration.

In an additionally preferred embodiment, the elastic element is positioned between a perimeter of the gear wheel and the lay shaft and, for instance, configured as a single piece item. Advantageously, the elastic element is positioned next to an external tooth arrangement of the gear wheel. With that, radial movement of the gear wheel is limited and noises are avoided.

As an advantageous embodiment of the invention, the elastic element is designed as an elastomer.

BRIEF DESCRIPTION OF THE DRAWINGS

Design examples of the invention are presented in the drawings, and are further described in the following, which show.

DETAILED DESCRIPTION OF THE PREFERRED EMBODIMENTS

Figure 1:
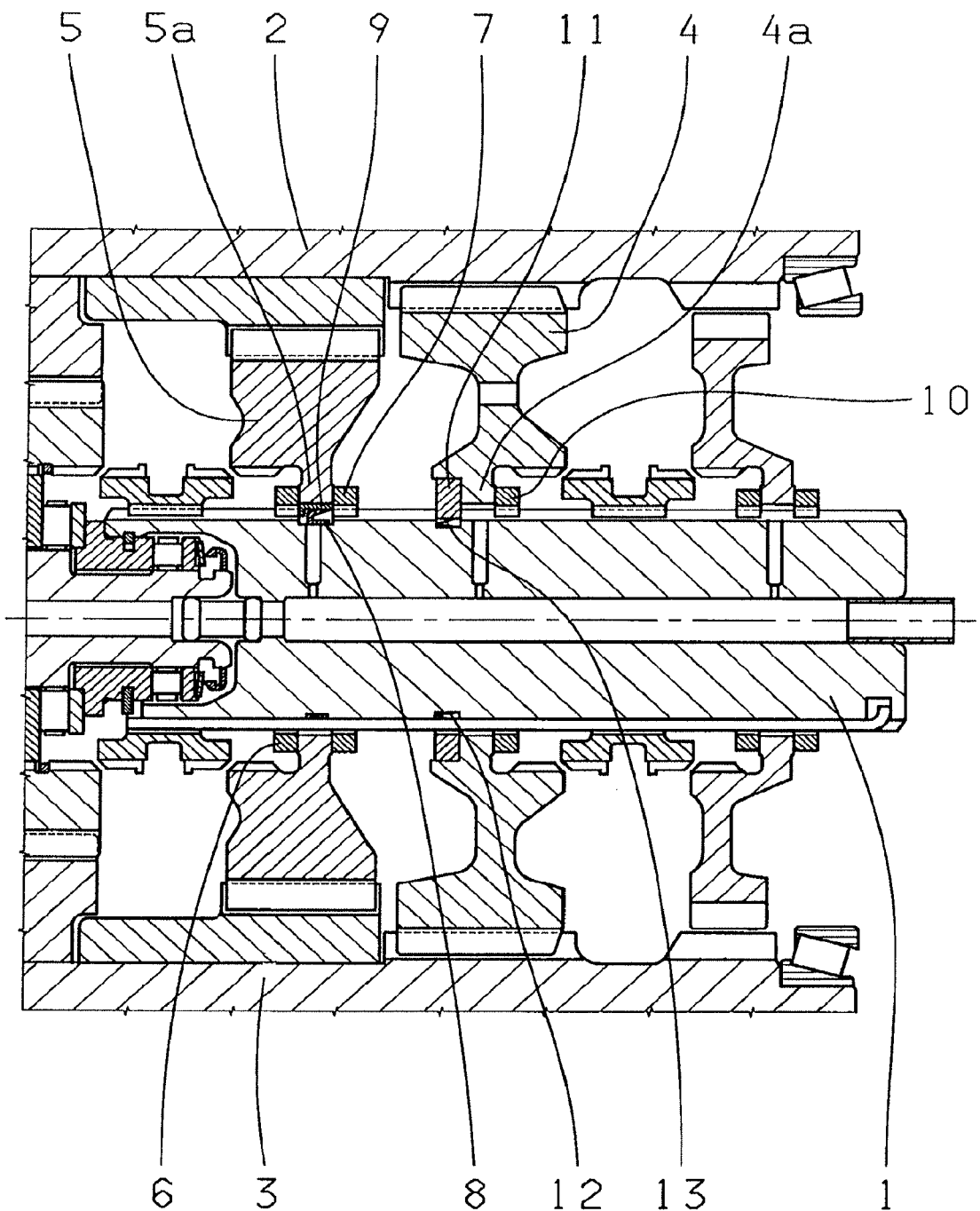
FIG. 1 A segment of a transmission in accordance with the invention, comprising two sum wheels, positioned on a main shaft, and FIG. 2 An additional example of the invention, comprising an elastic element, positioned between the gear wheel and the lay shaft.

FIG. 1 shows the segment of a transmission comprising a main shaft 1 and two lay shafts 2, 3, only being partially shown. Two gear wheels (toothed wheel) 4, 5 are positioned on the main shaft 1 and serve as the transmission's $1^{st}$ and $2^{nd}$ gears. In each case, the gear wheels 4, 5 mesh with the lay shaft 2, 3. The gear wheels 4, 5 are designed as idle gears, also called sum gears, and are movable in the radial direction, in relation to the main shaft 1, for reasons of the load equalization, meaning that radial play exists between the sum wheels 4, 5 and the main shaft 1. The gear wheel 5 comprises a hub area 5a which is maintained in position by a thrust washer 6, 7 on each side. An elastic element, configured as a spring ring 8, is mounted between the hub area 5a and the main shaft 1. In addition, a slide ring 9 is mounted between the spring ring 8 and the hub area 5a. Because of the combination of the spring ring 8 and the slide ring 9, radial movement between the gear wheel 5 and the main shaft 1 is limited and made more difficult due to the elastic reset force of the spring ring 8. As a result, unwanted noises, generated through external oscillation, is avoided.

A second configuration example is presented for the gear wheel 4. The gear wheel 4, also called sum wheel or tooth wheel, meshes with the lay shaft 2, 3 and is maintained by them in the radial direction. With reference to the main shaft 1, radial play is also provided for load compensation. The gear wheel 4 has a hub area 4a in which, on the right hand side of the drawing, the thrust washer 10 is positioned. On the left hand side in the drawing, the gear wheel 4 has a washer 11 with radial guidance, meaning that the washer 11 is a radial, integral part of the gear wheel 4. In the area of the washer 11, the main shaft 1 has a ring groove 12 in which an elastic element, designed as spring ring 13, is positioned and guided axially. Inward radial movement of the gear wheel 4 with respect to the main shaft 1 is, therefore, cushioned by the washer 11 and the spring ring 13.

Figure 2:
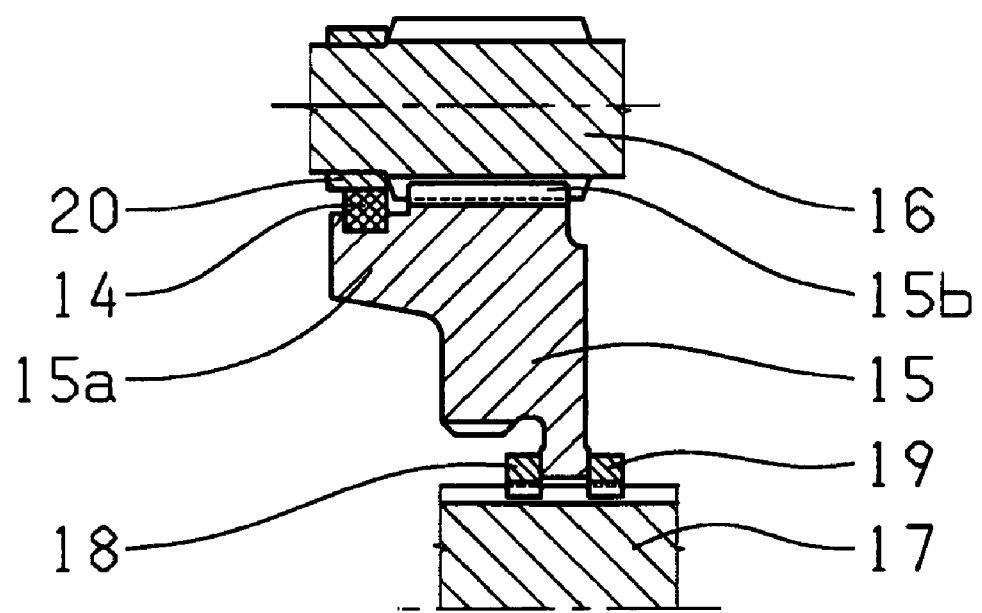

FIG. 2 shows another example of the invention comprising an elastic element 14 positioned between a gear wheel 15 and a lay shaft 16. The toothed wheel 15, also designed as sum or gear wheel, is radially movable with respect to a main shaft 17 and held by two thrust washers 18, 19. The gear wheel 15 meshes with the lay shaft 16 and also an additional lay shaft, not shown here, and is held in the radial direction. An elastic element 14 is positioned in an edge 15a of the gear wheel 15, adjacent to a tooth arrangement 15b thereof, and supports itself through a slide ring 20 on the lay shaft 16. Thus, any radial movement of the gear wheel 15, with respect to lay shaft 16, is absorbed via the elastic element 14 in conjunction with slide ring 20.

Supplemental to the shown examples, it is also possible and within the meaning of the invention to position the elastic elements between the gear wheel and the lay shaft, as well as between the gear wheel and the main shaft.

The invention claimed is:

1. A configuration of a gear wheel (4, 5, 15) on a main shaft (1, 17) of a transmission having at least two lay shafts (2, 3, 16),
   the gear wheel (4, 5, 15) being sum gear and meshing with mating gearing supported by each of the at least two lay shafts (2, 3, 16) and being movable in a radial direction, between the at least two lay shafts (2, 3, 16), and
   an elastic element (8, 13, 14) being radially positioned between the gear wheel (4, 5, 15) and at least one of the main shaft (1) and the lay shaft (16) for damping radial movement of the gear wheel with respect to at least one of the main shaft (1) and the lay shaft (16);
   wherein the gear wheel (4) is positioned on the main shaft (1) by a washer (11), with radial guidance in the gear wheel (4), and the elastic element (13) is positioned between the washer (11) and the main shaft (1).

2. The configuration as in claim 1, wherein the elastic element (8, 13, 14) is a spring ring which flexes in a radial direction.

3. The configuration as in claim 1, wherein the elastic element (8, 13, 14) is an elastomer.

4. The configuration as in claim 1, wherein the main shaft (1) has a ring groove (12) in which the elastic element (13) is positioned.

5. The configuration as in claim 1, wherein the gear wheel (15) has a tooth system (15b) and an edge (15a), and the elastic element (14) is positioned at the edge (15a) and adjacent to the tooth system (15b).

6. The configuration as in claim 1, wherein the elastic element (8, 13, 14) is a single piece.

7. A configuration of a gear wheel (4, 5, 15) on a main shaft (1, 17) of a transmission having at least two lay shafts (2, 3, 16);
   the gear wheel (4, 5, 15) being sum gear and meshing with mating gearing supported by each of the at least two lay shafts (2, 3, 16) and being movable in a radial direction, between the at least two lay shafts (2, 3, 16);
   an elastic element (8, 13, 14) being radially positioned between the gear wheel (4, 5, 15) and at least one of the main shaft (1) and the lay shaft (16) for damping radial movement of the gear wheel with respect to at least one of the main shaft (1) and the lay shaft (16); and
   the gear wheel (5) has a hub area (5a), which is held between two thrust washers (6, 7), and the elastic element (8) is positioned between the hub area (5a) and the main shaft (1).

8. The configuration as in claim 7, wherein a slide ring (9) is positioned between the hub area (5a) and the elastic element (8).

9. A configuration of a gear wheel (4, 5, 15) on a main shaft (1, 17) of a transmission having at least two lay shafts (2, 3, 16),
   the gear wheel (4, 5, 15) being sum gear and meshing with mating gearing supported by each of the at least two lay shafts (2, 3, 16) and being movable in a radial direction, between the at least two lay shafts (2, 3, 16), and
   an elastic element (8, 13, 14) being radially positioned between the gear wheel (4, 5, 15) and at least one of the main shaft (1) and the lay shaft (16) for damping radial movement of the gear wheel with respect to at least one of the main shaft (1) and the lay shaft (16),
   wherein the gear wheel (15) has a tooth system (15b) and an edge (15a), and the elastic element (14) is positioned at the edge (15a) and adjacent to the tooth system (15b), and
   the gear wheel (15) is positioned on the lay shaft (16) and both a slide ring (20) and the elastic element (14) are positioned between the gear wheel (15) and the lay shaft (16) with the slide ring (20) positioned between the elastic element (14) and the lay shaft (16).

10. An arrangement for a gear wheel (4, 5) of a main shaft (1) of a transmission having at least two lay shafts (2, 3), the arrangement comprising:
    the gear wheel (4, 5) radially engaging mating gearing of each of the two lay shafts (2, 3) and the gear wheel (4, 5) being axially retained on the main shaft (1) between a pair of thrust washers (6, 7);
    an elastic element (8) being axially retained between the pair of thrust washers (6, 7) and radially arranged between the main shaft (1) and a slide ring (9); and
    the slide ring (9) being axially retained between the pair of thrust washers (6, 7) and radially arranged between the elastic element (8) and an inner hub area (5a) of the gear wheel (4, 5), and the elastic element applying a radially directed force, from the main shaft (1) to the gear wheel (4, 5), such that radially directed movement of the gear wheel (4, 5) is reduced.

11. A configuration of a gear wheel (4, 5, 15) on a main shaft (1, 17) of a transmission having at least two lay shafts (2, 3, 16),
    the gear wheel (4, 5, 15) being sum gear and meshing with mating gearing supported by each of the at least two lay shafts (2, 3, 16) and being movable in a radial direction, between the at least two lay shafts (2, 3, 16), and
    an elastic element (8, 13, 14) being radially positioned between the gear wheel (4, 5, 15) and at least one of the main shaft (1) and the lay shaft (16) for damping radial movement of the gear wheel with respect to at least one of the main shaft (1) and the lay shaft (16),
    wherein the gear wheel (15) is positioned on the main shaft (1) and the gear wheel (15) has, with respect to the main shaft, a radially inner side and a radially outer side, and the elastic element (8, 13, 14) is radially positioned between the radially outer side of the gear wheel (4, 5, 15) and the lay shaft (16).

\* \* \* \* \*